Dec. 21, 1943.                D. W. SHERMAN                2,337,281
            DAMPING AND CUSHIONING DEVICE FOR SPRINGS
                          Filed July 28, 1941
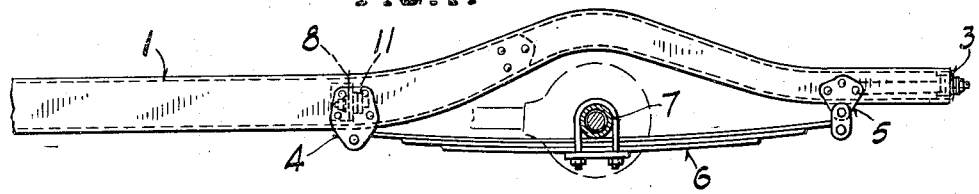
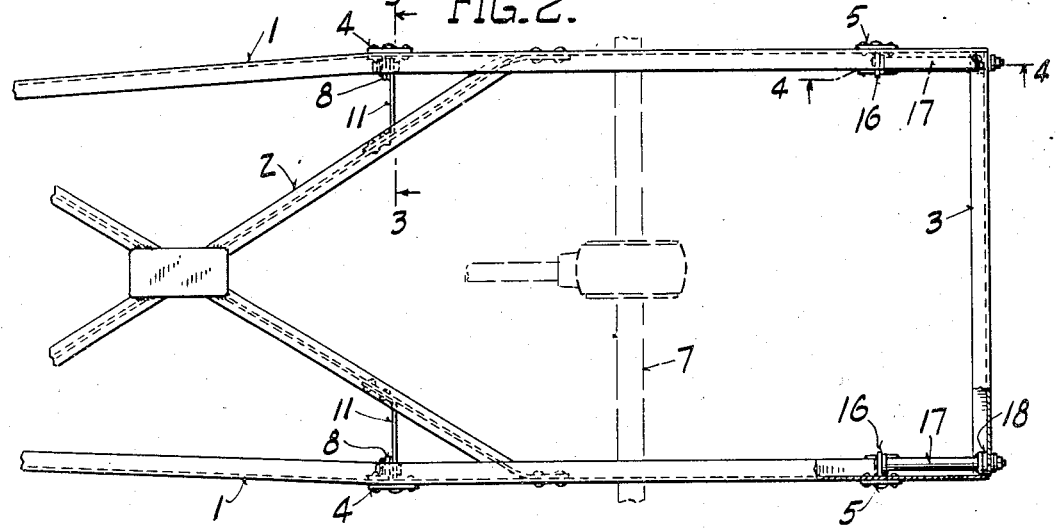
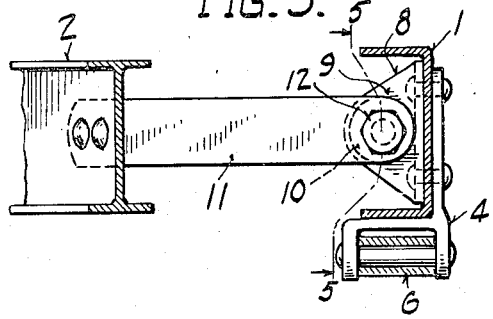
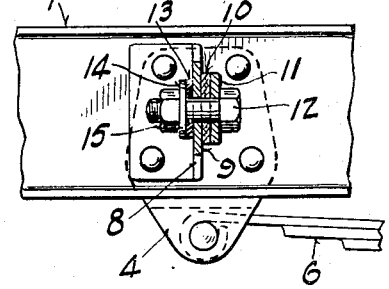
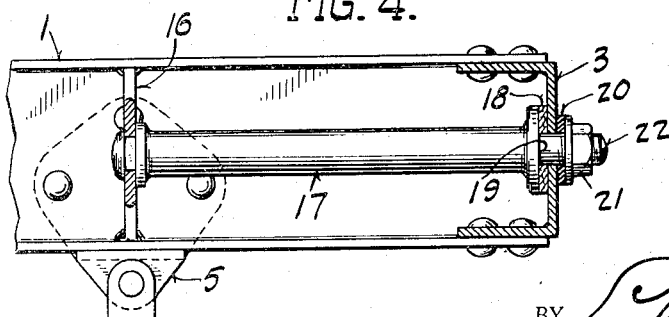
Donald W. Sherman
INVENTOR.
BY *[signature]*
ATTORNEY.

Patented Dec. 21, 1943

2,337,281

UNITED STATES PATENT OFFICE 2,337,281

DAMPING AND CUSHIONING DEVICE FOR SPRINGS

Donald W. Sherman, Shorewood, Wis., assignor to A. O. Smith Corporation, Milwaukee, Wis., a corporation of New York Application July 28, 1941, Serial No. 404,371

6 Claims. (Cl. 280—106)

This invention relates to a device for damping out lateral vibrations in a car equipped with leaf springs for the rear suspension.

An object of the invention is to provide improved means for cushioning against shock and damping out vibrations which would otherwise be transmitted to the frame and body of the car by transverse forces applied to the rear wheels.

A further object of the invention is to provide a device of this character which will improve the riding qualities of the car.

These and other objects of the invention will be clear from the following detailed description and the drawing in which:

Figure 1 is a side elevation of the rear end of an automobile frame equipped with the damping device of this invention;

Fig. 2 is a top plan view with parts broken away;

Fig. 3 is an enlarged view partly in elevation and partly in section taken on line 3—3 of Fig. 2;

Fig. 4 is an enlarged section taken on line 4—4 of Fig. 2; and

Fig. 5 is a section on line 5—5 of Fig. 3.

The invention is illustrated in the drawing in connection with a frame having an X cross member but can be used on other types of frames as well. The frame illustrated has side rails 1, an X cross member 2 and a rear cross member 3. Spring hangers 4 and 5 are secured to the side rails 1 for attachment of the leaf springs 6 interposed between the frame of the car and the rear axle 7.

In the operation of a car, forces transverse to its center line are applied to the rear wheels by the rounding of curves, by the striking of obstacles in the road, and by other causes. These transverse forces are transferred by the leaf springs 6 to the spring hangers 4 and 5 rigidly secured to the side rails 1 in positions which permit the spring hangers to move slightly in an arc about the axis of the side rail. This movement of the spring hanger and the resultant rotating and tensioning of the side rail cushions the shock and makes for smoother riding, and with the dampening means of the present invention does not result in periodic vibrations in the side rail and frame.

The present invention provides frictional means for damping out the torsional vibrations and improving the riding qualities of the car. Two modifications of the damping device are shown, one in connection with the front spring hanger, the other in connection with the rear. At the front spring hanger 4 a bracket 8 is rigidly attached to the side rail and spring hanger with a bearing surface 9 perpendicular to the side rail. Torsional vibrations of the side rail on its axis will cause rotary oscillation of the bearing surface in its own plane. A friction disk 10 is held between the bearing surfaces on the bracket and on an arm 11 secured to the X cross member 2. A shouldered bolt 12, rubber washer 13, steel washer 14, and nut 15 are used to hold the bearing surfaces in tight but not rigid engagement with the friction disk 10. The degree of compression between the parts is adjusted to a suitable value by proper choice of the rubber washer 13. The friction disk may be made of a number of materials available for this purpose, one being the substance sold under the trade name Silenite which possesses a sliding coefficient of friction closely equal to the static coefficient of friction.

The arrangement of parts shown is adapted for use when an X cross member frame is used. When a frame of different construction is used, the arm 11 is secured to any conveniently located longitudinal or cross member of the frame.

A somewhat different arrangement may be used to advantage for the rear spring hanger. As shown in Fig. 4, a bracket 16 is rigidly fastened to the side rail at the rear spring hanger 5 and to a longitudinal torsion member 17 located at or near the torsional axis of the side rail. Rotation of the side rail due to torsional loads rotates the torsion member 17 on its axis. A friction disk 18 is clamped between the rear cross member 3 of the frame and bearing surface 19 perpendicular to the axis of the torsion member 17. Tight but not rigid engagement of the friction disk is provided by means of a rubber or other resilient washer 20 held in position by a shouldered nut 21 engaging threaded end 22 of torsion member 17.

In the embodiment illustrated the torsion member is rigidly fastened to the bracket at the spring hanger and the frictional damper is mounted at the rear of the car, but the invention is not limited to this particular arrangement of parts. The friction between surfaces rotating with respect to one another damps out the torsional vibrations of the side rails.

The modification shown for the rear spring hanger can be used on the front one as well with a torsional member extending either forwardly or rearwardly from a bracket at the spring hanger to a cross member attached to the side rail.

I claim:

1. In an automobile frame, means for frictionally damping torsional vibrations of a side rail comprising a bearing surface substantially perpendicular to the torsional axis of the side rail and rigidly fastened to the side rail so as to oscillate rotationally in its own plane when the side rail vibrates torsionally, an opposed bearing surface secured against rotational oscillation, and a friction member held in engagement between the opposed bearing surfaces to damp out torsional vibrations of the side rail.

2. In an automobile frame with spring hangers for the attachment of a leaf spring rear wheel suspension, a bracket attached to a side rail adjacent a spring hanger, a bearing surface on the bracket substantially perpendicular to the torsional axis of the side frame, an opposing bearing surface secured against rotational oscillation, a friction disk between bearing surfaces, and means to hold the friction disk in engagement with the bearing surfaces to damp out torsional vibrations of the side rail.

3. In an automobile frame with spring hangers for the attachment of a leaf spring rear wheel suspension, a torsion member extending longitudinally along the torsional axis of a side rail from a point of attachment near a spring hanger to a part of the frame restrained against vibration, a bearing surface on the torsion member substantially perpendicular to its axis adapted to oscillate rotationally in its own plane when the side rail vibrates torsionally, an opposed bearing surface on the fixed part of the frame, a friction member between the two bearing surfaces, and means to hold the bearing surfaces in contact with the friction member to damp out torsional vibrations of the side rail.

4. In an automobile frame with spring hangers for the attachment of a leaf spring rear wheel suspension, a bearing surface substantially perpendicular to the torsional axis of a side rail rigidly secured to the side rail adjacent a spring hanger so as to oscillate rotationally in its own plane when the side rail vibrates torsionally, a torsion member having an opposed bearing surface and extending longitudinally of the side rail to an anchorage on a part of the frame restrained against vibration, a friction disk between the bearing surfaces, and means to hold them in engagement with the friction disk to damp out torsional vibrations of the frame.

5. In an automobile frame, a side rail, a spring mounting secured thereto and tending to torsionally rotate the side rail about a longitudinal axis, and a torsion damping arm disposed at right angles to the side rail and secured to a bracket thereon by a frictional connection to oppose and cushion the torsional rotation of the side rail at the spring mounting, the free end of said arm being secured to an adjacent frame member.

6. In an automobile frame, a side rail, a spring mounting secured thereto and tending to torsionally rotate the side rail about a longitudinal axis, and frictionally engaged members disposed to damp the torsional rotation of the side rail at the spring mounting.

DONALD W. SHERMAN.